United States Patent [19]
Fujii et al.

[11] Patent Number: 5,654,892
[45] Date of Patent: Aug. 5, 1997

[54] NAVIGATION SYSTEM DISPLAYING FORTHCOMING TURNS

[75] Inventors: Takao Fujii, Cupertino; Toshihiro Hamahata, Palo Alto; Haruhisa Tamai, Sunnyvale, all of Calif.

[73] Assignee: Zexel USA Corporation, Fort Worth, Tex.

[21] Appl. No.: 555,545

[22] Filed: Nov. 9, 1995

Related U.S. Application Data

[63] Continuation of Ser. No. 237,829, May 4, 1994, abandoned, which is a continuation of Ser. No. 779,037, Oct. 18, 1991, abandoned.

[51] Int. Cl.$^6$ .................................................. G06G 7/78
[52] U.S. Cl. ...................... 364/449.5; 364/449.2; 364/449.4; 364/444.1; 340/995; 340/988; 73/178 R
[58] Field of Search ..................... 364/443, 444, 364/449, 436, 424.03, 424.02, 571.04, 450, 452, 460, 457; 340/995, 990, 988, 902, 438, 936, 917, 989, 991, 993, 905, 994; 318/581, 16, 587; 342/450, 357, 457, 47, 176; 73/178 R; 180/167, 169

[56] References Cited

U.S. PATENT DOCUMENTS

| | | | |
|---|---|---|---|
| 4,084,241 | 4/1978 | Tsumura | 364/460 |
| 4,630,065 | 12/1986 | Ichikawa | 364/449 |
| 4,642,776 | 2/1987 | Matsumoto et al. | 364/449 |
| 4,646,089 | 2/1987 | Takanabe et al. | 364/424.01 |
| 4,653,002 | 3/1987 | Barry | 364/424.02 |
| 4,679,147 | 7/1987 | Tsujii et al. | 364/449 |
| 4,727,371 | 2/1988 | Wulkowicz | 340/917 |
| 4,768,153 | 8/1988 | Akamatsu | 364/457 |
| 4,782,447 | 11/1988 | Ueno et al. | 340/995 |
| 4,937,570 | 6/1990 | Matsukawa et al. | 340/995 |
| 4,939,662 | 7/1990 | Nimura et al. | 364/449 |
| 5,003,306 | 3/1991 | Takahashi et al. | 340/990 |
| 5,031,104 | 7/1991 | Ikeda et al. | 364/449 |
| 5,161,886 | 11/1992 | De Jong et al. | 364/449 |
| 5,184,123 | 2/1993 | Bremer et al. | 340/988 |
| 5,184,303 | 2/1993 | Link | 340/995 |
| 5,307,278 | 4/1994 | Hermans et al. | 364/450 |
| 5,321,614 | 6/1994 | Ashworth | 364/424.02 |
| 5,323,321 | 6/1994 | Smith, Jr. | 364/444 |

*Primary Examiner*—Jacques Louis-Jacques
*Attorney, Agent, or Firm*—Morrison Law Firm

[57] ABSTRACT

A vehicle navigation system displays arrow icons to a driver indicating the directions he must follow from each of one or more turning points on his route to keep the driver from passing inadvertently an intersection in which he must change the vehicle's direction of advance or from turning in an intersection prior to the intersection previously chosen for a turn. Road anomalies, such as sharp curves or U turns are also displayed. The arrow icons are alternatively created from computed directions of the vehicle's advance or stored in an X–Y storage unit from which an arrow icon best fitting the required guidance is selected. The stored arrow icons include straight road, single turns, and multiple turns. The selected arrow is displayed to the driver. An embodiment calculates turns and curves with angles which match the actual angles of the turns, and radii and turning angles of curves.

17 Claims, 6 Drawing Sheets

FIG.4A
GROUP A

FIG4B
GROUP B

NAVIGATION SYSTEM DISPLAYING FORTHCOMING TURNS

This application is a continuation of application Ser. No. 08/237,829, filed May 4, 1994, now abandoned, which is a continuation of application Ser. No. 07/779,037, filed on Oct. 18, 1991, now abandoned.

BACKGROUND OF THE INVENTION

This invention relates to a navigation system for a vehicle, which system guides the vehicle along a route from a staring place to a destination by displaying a direction for the vehicle to follow.

Figure 6A:
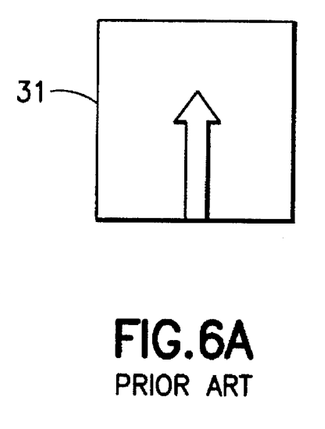
FIGS. 6(A), 6(B) and 6(C) are views of an arrow in a conventional prior-art navigation system.
Figure 6B:
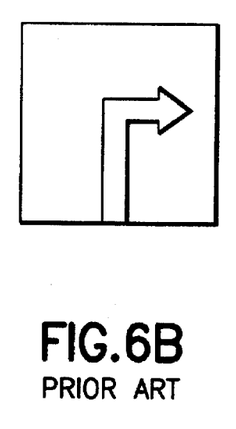
Figure 6C:
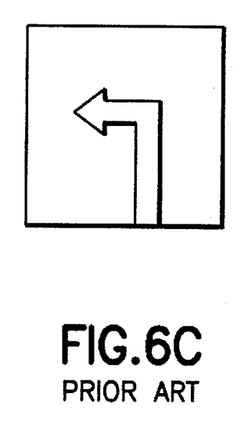

According to this system, when the vehicle is travelling straight ahead, as shown in FIG. 6(A), a straight arrow is displayed on a display unit. When the vehicle reaches the point where it must take some action such as change its direction (hereinafter called "a turning point"), such as an intersection where it must turn right or left, a right turn arrow or left turn arrow is displayed as shown in FIGS. 6(B) and 6(C). Therefore, the system guides the vehicle so that it travels on a predetermined route from the starting place to the destination. This technique is disclosed in, for example, Japanese Laid-open Patent Publication No. 60-200399.

The route from the starting place to the destination may be predetermined manually, leg by leg. Generally, however, when the starting place and the destination are entered, the navigation system computes the route from geographic information contained in a map database.

As shown in FIGS. 6(A), 6(B) and 6(C), the navigation system of the prior art displays a direction of advance for a single place only, that is, for straight ahead or for the next turning point. Until the vehicle passes the first turning point, there is no display of the direction of advance for a second and subsequent turning point, where the vehicle must change its direction again. Therefore, if two intersections that are turning points are dose together, the unalerted driver may pass the second turning point without sufficient advance warning to change direction. Further, if the road curves sharply after the first turning point, the driver will not see the sharp curve until he passes through the turning point. Such lack of warning is incompatible with safe driving.

OBJECTS AND SUMMARY OF THE INVENTION

A general object of this invention is to provide a navigation system for a vehicle in which the driver will not pass inadvertently an intersection where he must change the vehicle's direction, thereby insuring that he misses no required turns.

It is a further object of the present invention to warn the driver of an oncoming problem with his route, such as a sharp curve, thereby enhancing the safety of his driving.

Still a further object of this invention is to provide the driver of a vehicle with a visible display of the next change in his route.

Still a further object of this invention is to provide the driver of a vehicle with a visual indication of a route change or road difficulty that he can comprehend instantaneously.

Briefly stated, the present invention provides a vehicle navigation system that displays arrow icons to a driver indicating the directions he must follow from each of one or more turning points on his route to keep the driver from passing inadvertently an intersection in which he must change the vehicle's direction of advance or from turning in an intersection prior to the intersection previously chosen for a turn. Road anomalies, such as sharp curves or U turns are also displayed. The arrow icons are alternatively created within the system from computed directions of the vehicle's advance or selected from arrows stored in an X–Y storage unit from which an arrow icon best fitting the required guidance is selected. The stored arrow icons include straight road, single turns, and multiple turns. The selected arrow is displayed to the driver.

According to an embodiment of the invention, there is provided a navigation system for a vehicle comprising means for computing a direction of advance from a turning point before the vehicle reaches the turning point; means for creating an arrow icon representing a particular combination of turn directions of the vehicle; and means for displaying the icon most closely representing turn directions of nearest ones of the turning points.

According to a feature of the invention, there is provided a means for storing a plurality of arrow icons, each representing a particular combination of directions of advance of the vehicle, the plurality of icons including at least some icons representing at least two successive turning points; and means for displaying a one of the plurality of icons most closely representing turn directions of nearest ones of the turning points.

According to another feature of the invention, there is provided a method for assisting the navigation of a vehicle comprising the steps of computing a direction of advance a predetermined time or distance before the vehicle reaches a first turning point; creating an arrow icon or choosing one of a plurality of arrow icons, the created or chosen icon representing at least one direction of advance of the vehicle; and displaying the arrow icon.

According to a further feature of the invention, there is provided a navigation system for a vehicle comprising: a computer, the computer including means for computing a direction of advance from a turning point before the vehicle reaches the turning point, means for creating an arrow icon representing a particular combination of directions of advance of the vehicle, and a display to display the arrow from a signal corresponding to the arrow icon.

According to a further feature of the invention, there is provided a navigation system for a vehicle comprising: a computer, the computer including means for computing a direction of advance from a turning point before the vehicle reaches the turning point; means for storing a plurality of arrow icons, each representing a particular combination of directions of advance of the vehicle; means for choosing a one of the arrow icons best representative of at least one of the direction of advance, and a display to display each of the plurality of arrow icons from a signal corresponding to each arrow icon respectively.

According to a further feature of the invention, there is provided a navigation system comprising: an X–Y array of arrow icons, means for determining at least one turn in a predetermined distance or travel time ahead of the vehicle, means for selecting one arrow icon defined by a value for X and a value for Y, means for identifying a one of the X–Y array of arrow icons most closely representing the at least one turn, and means for displaying the one of the X–Y array of arrow icons.

According to a further feature of the invention, there is provided a navigation system for a vehicle comprising: means for determining a road shape along a route of travel of the vehicle, the road shape including at least one of a turn and a curve, the turn having an angle, the curve having a radius and a turning angle, means for displaying a next-occurring of the turn or the curve, including the angle if a turn, and the radius and turning angle if a curve, and means for displaying a second-occurring of the turn or the curve, including the angle if a turn, and the radius and turning angle if a curve.

The above, and other objects, features, and advantages of this invention will become apparent from the following description read in conjunction with the accompanying drawings, in which like reference numerals designate the same elements.

DETAILED DESCRIPTION OF THE PREFERRED EMBODIMENTS

Figure 1:
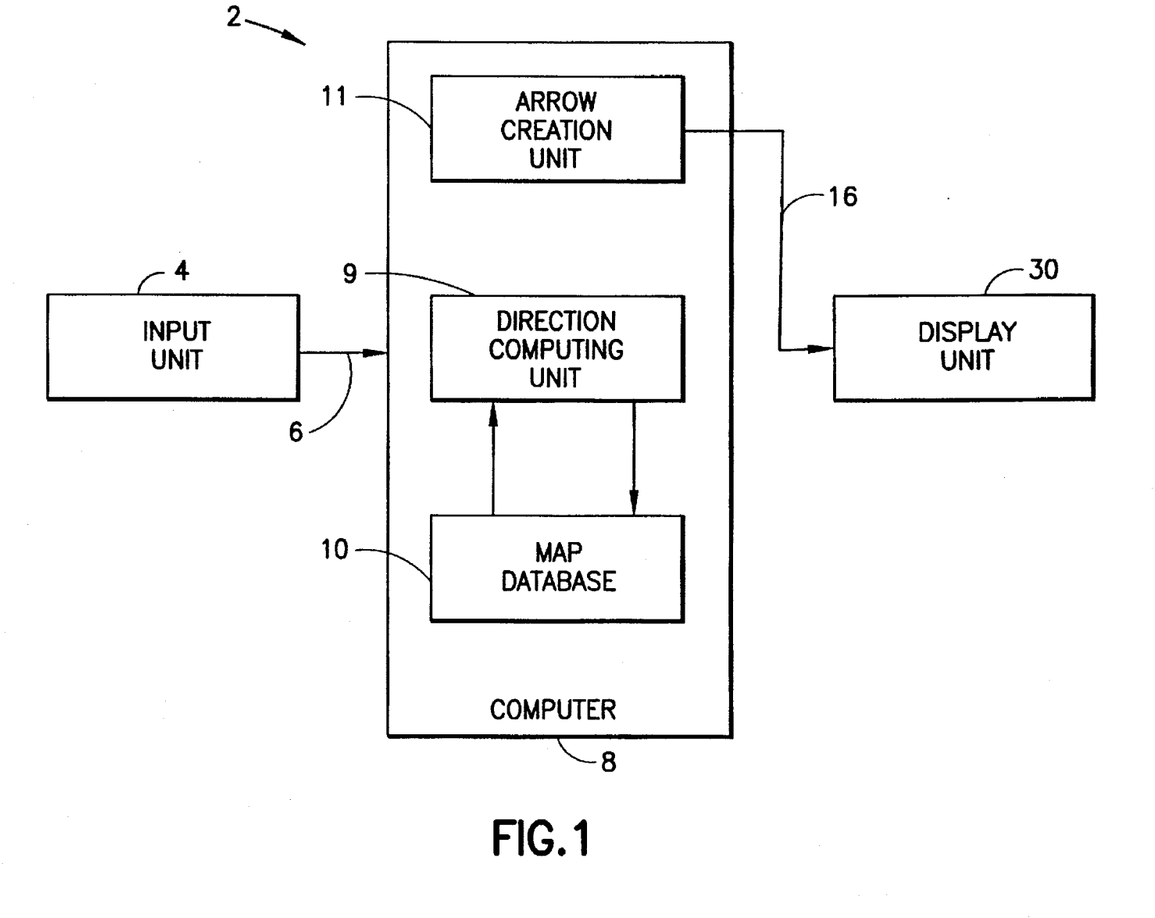
FIG. 1 is a block diagram of a navigation system according to an embodiment of the present invention in which an arrow is created by the system.

Referring to FIG. 1, a vehicle navigation system shown generally at 2 includes an input unit 4 into which are entered a starting place and a destination. Input unit 4 sends a signal representing these ends of the vehicle's route on a line 6 to a computer 8. Computer 8 computes an optimal route from the starting place to the destination in accordance with geographic information from a map database 10 or from an internal or external memory source such as a CD-ROM, an IC card, or the like. Within computer 8, a direction computing unit 9 computes, from the optimal route, one or more directions of the vehicle's advance. An arrow creation unit 11, having received a direction signal from direction computing unit 9, creates an arrow that best represents the next one or more turns required from the present position and direction of the vehicle. The arrow is sent on a line 16 to a display unit 30 where it is displayed.

When the vehicle is travelling straight, a straight arrow, the same as prior-art straight arrow 31, as shown in FIG. 6(A), is displayed on display unit 30.

When, from the present position of the vehicle to an intersection where the road to be followed after a change of direction is not straight, such as a sharp curve, the distance becomes smaller than a predetermined distance, or when a time of travel, from the present position of the vehicle to a turning point, becomes less than a predetermined time, an arrow indicating the change of direction is displayed on display unit 30.

Figure 2:
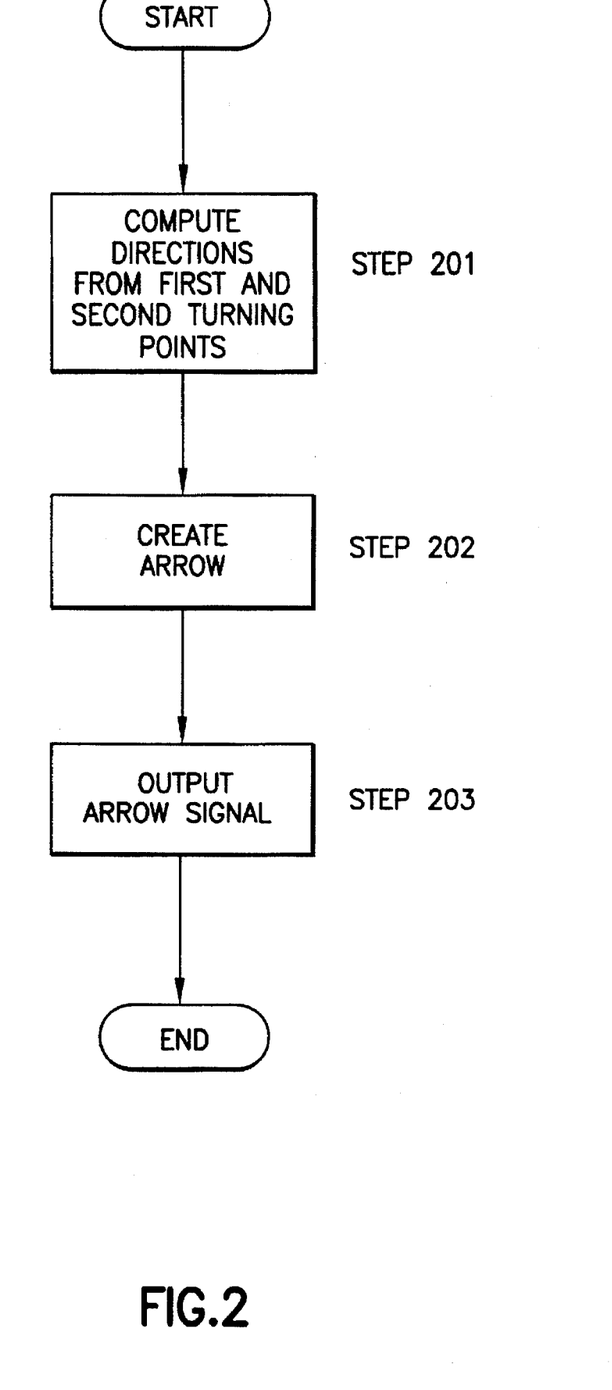
FIG. 2 is a flow chart of a program for creating and displaying an arrow in the system diagrammed in FIG. 1.

Referring to FIG. 2, a program based on the flow chart is executed when the aforedescribed distance becomes smaller than the predetermined distance, or when the time to destination becomes less than the predetermined time. After the program starts it computes (Step 201) in direction computing unit 9 an optimal route and the directions to follow it. These directions are sent (Step 202) to the arrow creation unit, where an arrow icon is created and the signal to display it is sent to display unit 30 (Step 203). The arrow may be created in arrow creation unit 11 from standard directions as displayed in FIG. 4. Alternatively, the arrow is created on the fly from the actual road angles of the optimal route computed in computer 8.

Figure 3:
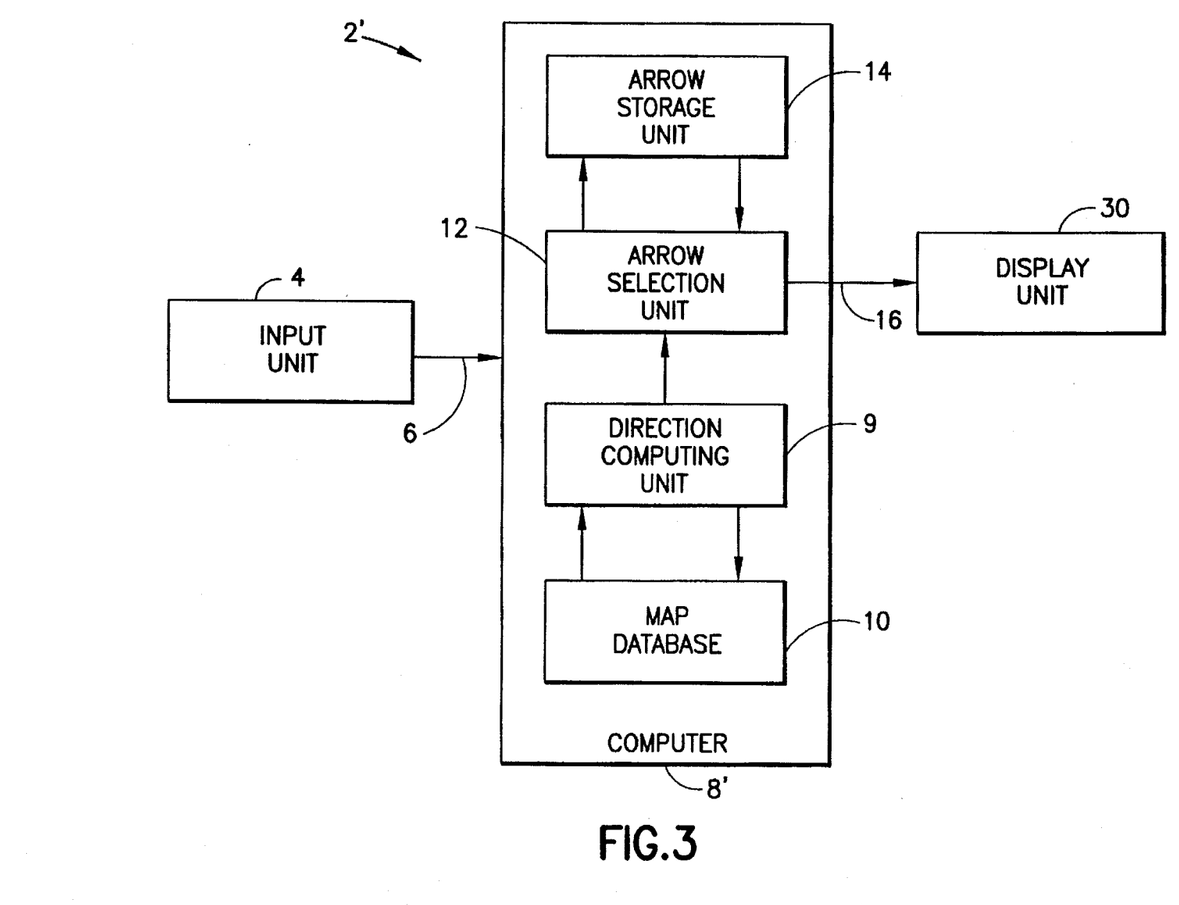
FIG. 3 is a block diagram of a navigation system according to an embodiment of the present invention in which an arrow is selected from among a plurality of arrows stored in the system.

Referring to FIG. 3, a vehicle navigation system, shown generally at 2', contains a computer 8'. Within computer 8' are arrow selection unit 12 and arrow storage unit 14 in the place of arrow creation unit 11 of computer 8; other units are the same. Arrow selection unit 12, after receiving directions computed in direction computing unit 9, selects the appropriate arrow from among those stored in arrow storage unit 14. Arrow selection unit 12 then outputs the selected arrow to display unit 30 over line 16.

Referring to FIG. 4, a program based on the flow chart is executed at an appropriate time as described above with reference to FIG. 2. After the program starts, in Step 101 the following search is conducted: how many places exist in the predetermined area (hereinafter called a "searching area") along the optimal route where the direction of advance must be changed at least twice in rapid succession? For each pair (or more) of such places that are found, the first such place (hereinafter called the "first turning point") is entered on a list generated by the search.

The size of the searching area may be predetermined at the driver's option, provided it be set small enough that the vehicle not pass through a designated turning point without changing its direction.

Figure 4A:
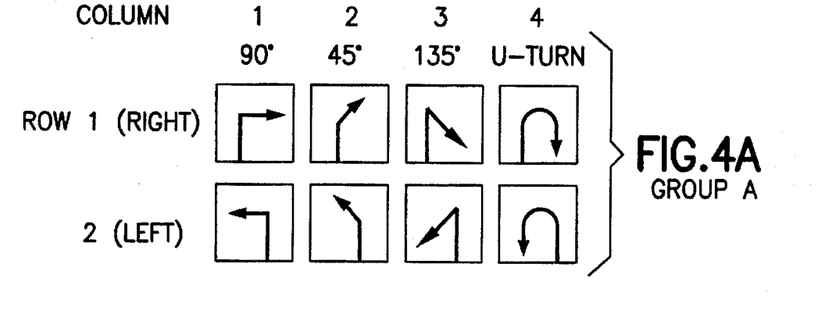
FIG. 4(A) shows a group of arrows for an example in which there exists in a predetermined area only one turning point on the vehicle's route.

When there is only one turning point in the area searched, the direction of advance from that point is computed (Step 102), and the arrow most suitable for the computed direction is selected (Step 103) from the group (A) of arrows shown in FIG. 4(A).

When a plurality of places where the vehicle's direction must be changed ("turning points") exists in the searching area, only the directions from the first turning point and its nearest neighbor (hereinafter called the "second turning point") are computed (Step 104), and the arrow most suitable for the computed directions is selected (Step 105) from the group (B) of arrows shown in FIG. 4(B).

If there are in the searching area more than a first and a second turning point, it is possible to compute the directions from all turning points, but their arrows will be complicated and visually unclear. Accordingly, it is desirable to compute only two directions from two turning points, however, computation and display of more than two directions should not be considered to lie outside the scope of the invention.

Figure 4B:
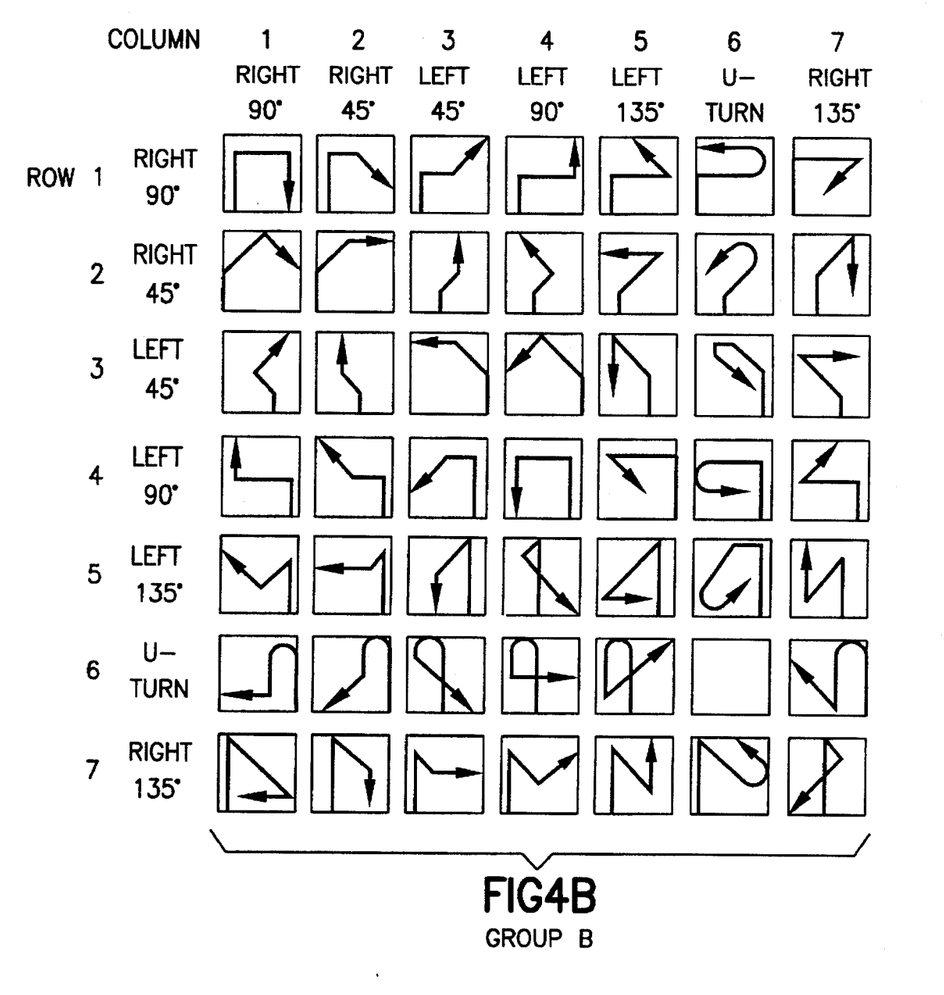
FIG. 4(B) shows a group of arrows for an example in which there exist, in a predetermined area, two or more turning points on the vehicle's route.

Referring to FIGS. 4(A) and 4(B), each of groups (A) and (B) of arrows occupies a matrix indicating different directions, each matrix having n rows and m columns. In particular, group (A) has n=2 and m=4, for 8 arrows in 2 rows and 4 columns. An arrow from group (A) shows only a single change of direction relative to the present direction of advance of the vehicle. Group (B) has n=m=7, for 48 arrows in 7 rows and 7 columns, since there is a blank at the intersection of the sixth row and sixth column.

All arrows are contained in the internal memory of computer 8 or in an external memory such as a CD-ROM or the like.

Each stored arrow consists of a body segment indicating the current direction of advance, a head segment indicating the final direction, and, where two changes of direction are required, a middle segment indicating the first change of direction. As shown in FIGS. 4(A) and 4(B), the arrows indicate the following directions of advance: four (4) indicate upward, downward, leftward, and rightward directions and six (6) indicate 45 degrees right/upward and 45 degrees right/downward. In addition, it is possible to prepare a greater variety of arrows by adding, for example, 22.5 degrees right/upward, 22.5 degrees right/downward, 67.5 degrees right/upward, 67.5 degrees right/downward, etc. It is believed, however, that the groups of arrows shown in FIGS. 4(A) and 4(B) give a vehicle operator sufficient cues to permit safe and comfortable operation of the vehicle.

An arrow is selected by choosing the respective row and column. For example, for a right turn at the first turning point of 90 degrees from the present direction of advance of the vehicle, an arrow from the first row and first column of group (A) is selected ("arrow 1-1"). For a left turn of 135 degrees, arrow 2-3 is selected.

In group (B), when the vehicle is to turn right 90 degrees at the first turning point and then turn right 90 degrees at the second turning point, arrow 1-1 is selected. When the vehicle must turn left 45 degrees at the first turning point and then make a U-turn at the second turning point, arrow 3-6 is selected.

Figure 5:
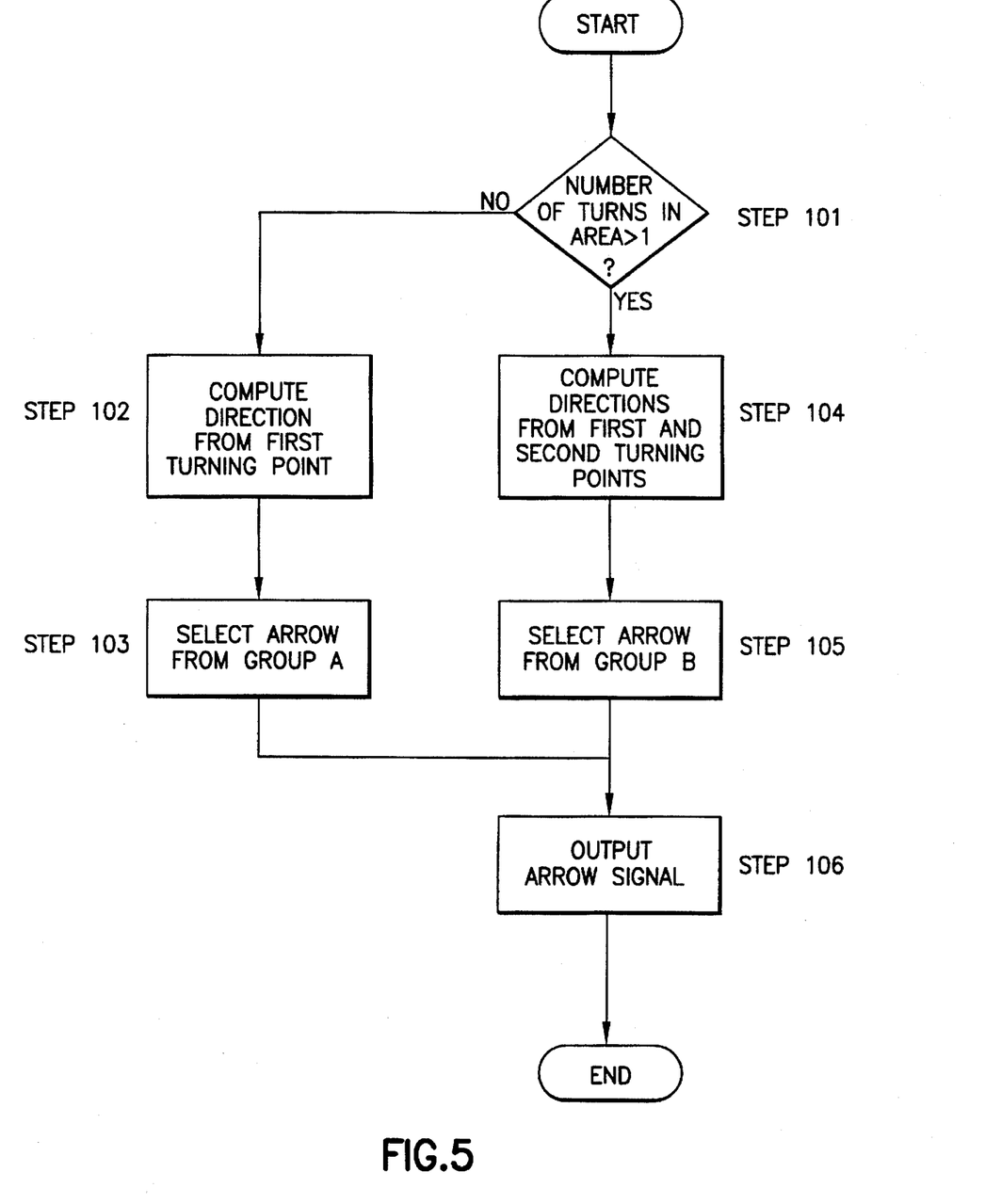
FIG. 5 is a flow chart of a program for selecting and displaying an arrow in the system diagrammed in FIG. 3.

Referring again to FIG. 5, after an arrow representing the computed direction has been selected, a signal corresponding to the arrow is sent to display unit 30 (Step 106). Display unit 30 displays one of the arrows as shown in FIGS. 4(A) and 4(B).

Display unit 30 may be of any convenient type, for example, CRT, LCD, LED, mechanical, or optical. Other types of display devices now existing or later invented should be understood to be within the spirit and scope of this invention.

Further, whether the arrow is created or selected, display unit 30 may also display the names of the road on which the vehicle is currently travelling, the road to follow from the first turning point, and the road to follow from the second turning point.

When two turning points exist in the predetermined searching area, an arrow that indicates the direction of advance at both turning points is displayed on display unit 30. Accordingly, the driver avoids passing through the turning point where he must change direction without turning. When the driver comes upon a sharp curve after he has changed direction, he receives prior notice of the sharp curve. Thus the safety of his driving is enhanced.

Also, according to the foregoing embodiment, the display on display unit 30 can confirm whether the number of turning points in the searching area is one or two. Yet this confirmation may not be necessary. If it is unnecessary, the two groups of selected arrows (A) and (B) may be united into a single group, and thus a specified arrow may be selected from the single group. In this technique, for example, row 1 from group A may be defined as a new row 8 in group B, and row 2 from group A may be defined as a new row 9 in group B. A straight arrow 31 (FIG. 6(A)) may be appended to row 8 or 9. The unused columns in rows 8 and 9 may be left blank. The technique of combining all possible arrows into a single matrix has the advantage that the arrows can be retrieved from addresses in arrow storage unit 14 by specifying only two digits.

However, in some applications, a desired arrow can be selected more rapidly by dividing them into two groups A and B as shown in FIGS. 4(A) and 4(B).

Further, in the foregoing embodiment, the vehicle's direction is computed for the predetermined area, thus allowing the arrow corresponding to the direction to be selected as shown in FIGS. 2 and 4. Alternatively, as shown in FIGS. 1 and 3, an arrow that corresponds to an actual route may be created and displayed.

Still further, according to the foregoing embodiment, the vehicle's direction in the predetermined area is computed by computer 8, not only from the first turning point, but also from the vehicle's present position. In the latter case, the searching area may be enlarged, so that the driver can be notified by the arrows on display unit 30 that he is approaching the first and second turning points well before his vehicle reaches the first turning point. Therefore, the driver is prevented from passing inadvertently through the turning point without turning. Moreover, safe driving is also assisted by the advance warning provided by this system.

In the foregoing, arrow icons are selected from a limited number of candidates. In a further embodiment of the invention, an infinite number of icons is made available by calculating an actual angle of turn at each turning point, and displaying such actual angle of turn. This embodiment is especially useful in representing curves and turns that are more or less than 90 degrees. In the fixed-icon case, a curve is represented by its turning angle (the difference between the vehicle direction at the beginning of the curve, and the vehicle direction at the end of the curve), and its left-right turn direction. In many cases, a vehicle operator is vitally interested in the radius of curvature of the curve, since this has a critical effect on the speed at which the curve can be negotiated. Fixed icons are adaptable only with difficulty to informing the vehicle operator about the radius of a turn. In the embodiment of the invention in which the actual turn angles are imaged by the computer, the icon displayed for a curve can include both radius and turn angle, thus improving driving safety.

Having described the preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A navigation system for a vehicle comprising:
   means for continuously computing a plurality of directions of advance until said vehicle reaches a destination point, said plurality of directions of advance immediately following an upcoming turning point from a current direction of advance;
   means for creating an icon representing said current direction of advance and said plurality of directions of advance; and
   means for displaying said icon before said vehicle reaches said upcoming turning point.

2. A navigation system as in claim 1, in which said means for continuously computing computes said plurality of directions of advance a predetermined travel distance ahead of a present position of said vehicle.

3. A navigation system as in claim 1, wherein said means for continuously computing computes said plurality of directions of advance a predetermined travel time ahead of a present position of said vehicle.

4. A navigation system for a vehicle comprising:
   means for continuously computing a plurality of successive directions of advance until said vehicle reaches a destination point, said plurality of successive directions of advance immediately following an upcoming turning point from a current direction of advance;

means for storing a plurality of arrow icons, each representing a particular combination of said plurality of successive directions of advance of said vehicle;

said plurality of arrow icons including at least some icons representing at least two successive turning points;

said means for storing includes means for storing an X–Y array of said plurality of arrow icons, a position of each one of said plurality of arrow icons in said X–Y array being dependent on characteristics of said particular combination of said plurality of successive directions of advance; and means for displaying one of said at least some icons that most closely represents said current direction of advance and said plurality of successive directions of advance before said vehicle reaches said upcoming turning point.

5. A navigation system as in claim 4, in which said means for continuously computing computes said plurality of successive directions of advance a predetermined travel distance ahead of a present position of said vehicle.

6. A navigation system as in claim 4, wherein said means for continuously computing computes said plurality of successive directions of advance a predetermined travel time ahead of a present position of said vehicle.

7. A navigation system as in claim 4, wherein said means for displaying includes means for identifying a desired one of said plurality of arrow icons by its X and Y positions in said X–Y array.

8. A method for assisting the navigation of a vehicle comprising the steps of:

continuously computing a plurality of successive directions of advance until said vehicle reaches a destination point, said computing being initiated at one of a predetermined time or a predetermined distance before said vehicle reaches an upcoming turning point from a current direction of advance;

creating an arrow icon that represents said current direction of advance and at least a first and a second directions of advance of said vehicle to be followed beginning at said upcoming turning point; and displaying said arrow icon before said vehicle reaches said upcoming turning point.

9. A method for assisting the navigation of a vehicle comprising the steps of:

continuously computing a plurality of successive directions of advance until said vehicle reaches a destination point, said computing being initiated at one of a predetermined time or a predetermined distance before said vehicle reaches an upcoming turning point from a current direction of advance;

storing a plurality of arrow icons;

selecting from said plurality of arrow icons one thereof most representative of said current direction of advance and said plurality of successive directions of advance;

identifying each of said plurality of arrow icons by a signal; and displaying said one of said plurality of arrow icons responsive to said signal.

10. A navigation system for a vehicle comprising:

a computer;

said computer including means for continuously computing a plurality of successive directions of advance until said vehicle leaches a destination point, said plurality of successive directions of advance immediately following an upcoming turning point from a current direction of advance;

means for creating an icon that represents said current direction of advance and said plurality of successive directions of advance; and means for displaying said icon before said vehicle reaches said upcoming turning point.

11. A navigation system for a vehicle comprising:

a computer;

said computer including means for continuously computing a plurality of successive directions of advance until said vehicle reaches a destination point, said plurality of successive directions immediately following a turning point from a current direction of advance;

means for storing a plurality of arrow icons, each representing a particular combination of successive directions of advance of said vehicle;

means for choosing one of said plurality of arrow icons best representative of said current direction of advance and at least one of said plurality of successive directions of advance;

said means for storing includes means for storing an X–Y array of said plurality of arrow icons;

means for identifying a desired one of said plurality of arrow icons by its X and Y positions in said X–Y array; and means for displaying said one of said plurality of arrow icons.

12. A navigation system comprising:

means for storing a matrix of arrow icons;

means for determining at least one turn, having first and second characteristics, at one of a predetermined distance or a predetermined travel time ahead of a current position of said vehicle;

said matrix being organized into columns that correspond to possible values for said first characteristic and rows that correspond to possible values for said second characteristic;

means for selecting from said means for storing an arrow icon in a column corresponding to a value of said first characteristic and in a row corresponding to said second characteristic that most closely represents said at least one turn; and means for displaying said arrow icon.

13. A navigation system according to claim 12, wherein said one of a predetermined distance or a predetermined travel time is a predetermined distance.

14. A navigation system according to claim 12, wherein said one of a predetermined distance or a predetermined travel time is a predetermined travel time.

15. A navigation system according to claim 12, wherein:

said means for determining determines up to two turns; and said matrix of arrow icons includes arrow icons for a plurality of single turns and arrow icons for a plurality of sequences of two turns.

16. A navigation system for a vehicle controlled by an operator, comprising:

means for determining a road shape along a route of travel of said vehicle, said road shape including at least one of a turn and a curve, said turn having an angle, said curve having a radius and a turning angle;

means for displaying to said operator a first-occurring one of said turn or said curve, including said angle when said first-occurring one is a turn, and said radius and said turning angle when said first-occurring one is a curve;

means for displaying to said operator a second-occurring one of said turn or said curve, including said angle when said second-occurring one is a turn, and said radius and said turning angle when said second occurring one is a curve; and means for displaying said first-occurring one and said second-occurring one simultaneously to said operator.

17. A navigation system for a vehicle comprising:

means for continuously computing a plurality of directions of advance, and respective turning points of said plurality of directions of advance, before said vehicle reaches a first of said turning points;

means for creating an icon representing a current direction of advance and a first of said plurality of directions of advance;

means for displaying said icon when said respective turning points of two of said plurality of directions are beyond one of a first predetermined time interval or a first predetermined distance interval;

means for displaying said icon when said respective turning points of said two of said plurality of directions are within one of a second predetermined time interval or a second predetermined distance interval;

said first predetermined time interval being larger than said second predetermined time interval; and said first predetermined distance interval being larger than said second predetermined distance interval.

* * * * *